United States Patent [19]

Yamazaki

[11] Patent Number: 5,193,006

[45] Date of Patent: Mar. 9, 1993

[54] VIDEO DISPLAY APPARATUS FOR PICTURES WITH DIFFERENT ASPECT RATIOS

[75] Inventor: Eiichi Yamazaki, Ichihara, Japan

[73] Assignee: Hitachi, Ltd., Tokyo, Japan

[21] Appl. No.: 301,461

[22] Filed: Jan. 26, 1989

[30] Foreign Application Priority Data

Jan. 29, 1988 [JP] Japan ................................. 63-17002
Jan. 29, 1988 [JP] Japan ................................. 63-17003
Jan. 29, 1988 [JP] Japan ................................. 63-17004

[51] Int. Cl.⁵ ......................... H04N 5/08; H04N 7/08
[52] U.S. Cl. ..................................... 358/242; 358/142
[58] Field of Search ................ 358/242, 141, 230, 142

[56] References Cited
U.S. PATENT DOCUMENTS 4,670,784 6/1987 Goldberg ............................ 358/242

*Primary Examiner*—Tommy P. Chin
*Attorney, Agent, or Firm*—Antonelli, Terry Stout & Kraus

[57] ABSTRACT

When a picture display section (or screen) for high-quality TV system (HDTV system) is used for displaying pictures of ordinary TV system with an aspect ratio different from that of the high-quality TV picture, the blank portions on the screen where no picture is illuminated to display at a brightness level almost equal to a picture mean luminance so that there will be no local variations in the luminace on the screen due to deterioration of fluorescent materials on the screen. For this purpose, the picture display portion is moved over the screen; or the video signals are attenuated toward the ends of the picture display portion. As a result, the variations in luminance on the screen become small and unnoticeable.

2 Claims, 4 Drawing Sheets

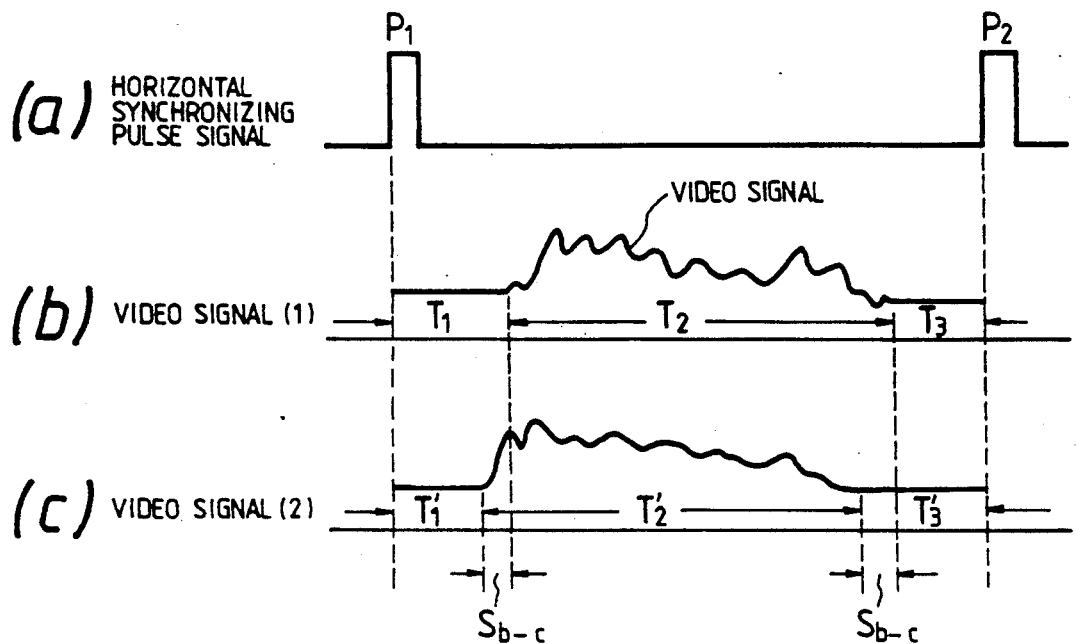
FIG. 8
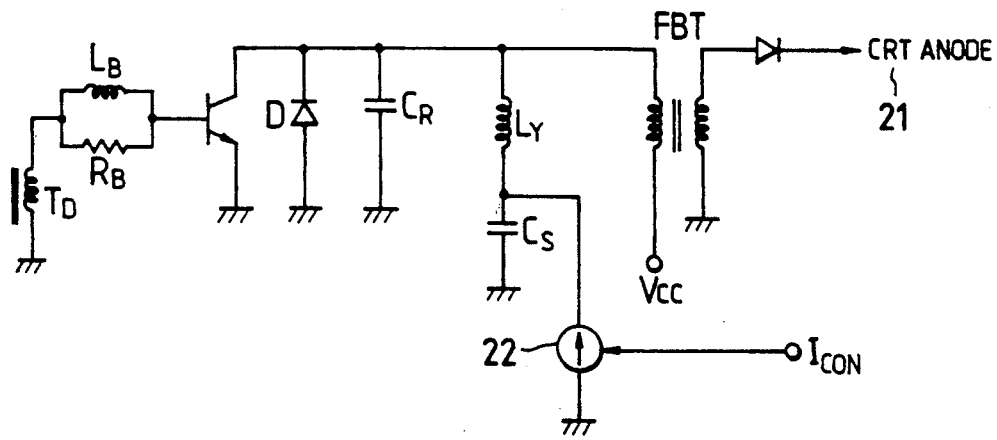
FIG. 9
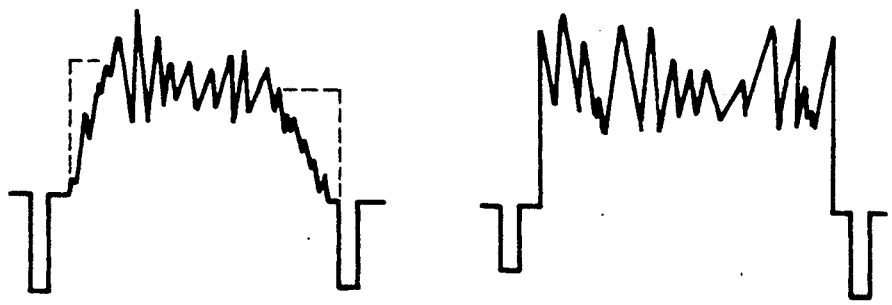
FIG. 10
FIG. 11 PRIOR ART

VIDEO DISPLAY APPARATUS FOR PICTURES WITH DIFFERENT ASPECT RATIOS

BACKGROUND OF THE INVENTION

This invention relates to a video display apparatus suitable for displaying a video picture with an aspect ratio different from that of the video screen, and more particularly to a video display apparatus suitable for displaying standard TV pictures (with, say, 525 scanning lines and the aspect ratio of 4:3) on the screen of a display apparatus for high-quality TV system (called Hi-Vision TV or HDTV with, say, 1125 scanning lines and the aspect ratio of 16:9).

Ordinary TV receiver screens have the aspect ratio (the ratio of frame width to frame height) of 4:3 and the fluorescent surface is also sized to this ratio. On the other hand, for the high-quality TV such as HDTV or Hi-Vision TV (generally called HDTV (high definition TV) hereafter), new aspect ratios such as 5:3 and 16:9 are being proposed. To receive such high-quality pictures requires a wide-screen television receiver. In addition to displaying the HDTV pictures, the wide-screen television receiver is also required to receive ordinary TV images (aspect ratio of 4:3) because of economy and ease of handling. When, however, a picture with an aspect ratio of 4:3 is displayed on a fluorescent screen with an aspect ratio of 16:9, blank portions 2, 2', 2" where no picture is displayed are formed on one side or both sides of the screen as shown in FIGS. 1 to 3. What matters in this case is that if such a condition is allowed to persist for many hours, the fluorescent surface on the picture display portions 1, 1', 1" of the screen will deteriorate or its lumianance level will be reduced as a result of the browning phenomenon of the panel glass. This in turn produces variations in brightness on the screen when the entire fluorescent surface is used for displaying the HDTV picture for which the display is originally intended. The luminance variation conspicuously shows along the boundary line between the ends of the conventional 4:3-aspect-ratio picture area and the blank portions, thereby spoiling the view when the HDTV picture is shown on the entire screen. Thus, the quality of the HDTV picture as a whole is badly impaired.

The technique of receiving video signals of both the high-quality TV (HDTV) system and the standard TV system and of switching between the two systems are already known and thus not described here. Description of such a technique may be found in the Japanese Patent Application Laid-Open No. 26173/1988.

Apart from those proposed by this invention, the conventional techniques to reduce the level of nuisance the observer may feel from the blank portions, which occur when ordinary TV pictures are displayed on the wide-screen HDTV receivers, include the following.

That is, the Japanese Patent Application Laid-Open No. 33087/1986 describes a technique in which when ordinary TV pictures are displayed on the screen, frame lines are provided on the boundary between the picture display portion and the blank portions to trim away the unnecessary blank portions that occur on one side or both sides of the screen due to the difference in aspect ratio between the two types of pictures.

The Japanese Patent Application Laid-Open No. 128670/1987 shows a technique in which a mask plate is provided on the blank portions of the screen to cover them from view when ordinary TV pictures are displayed on the wide-screen HDTV receiver because the blank portions on the fluorescent screen left shown on each side of the picture display portion will spoil the view of the screen.

In the Japanese Patent Application Laid-Open No. 26173/1988, a technique is introduced in which when ordinary size TV pictures are shown on the wide-screen HDTV receiver, an arbitrary mono-color is displayed on the blank portion on the screen to give an improved or pleasant appearance of the screen.

These conventional practices, as shown above, take measures only with respect to the impaired view of the overall screen when ordinary TV pictures are displayed on the wide-screen HDTV receivers.

However, these measures do not solve another important problem that occurs with TV display apparatuses that can display both the HDTV pictures and the ordinary TV pictures. This problem is the imbalance in luminance level on the fluorescent surface between the picture display portions and the blank portions on the screen after the ordinary TV pictures have been displayed on the wide-screen HDTV receivers for many hours. In other words, when the HDTV picture is displayed on the screen, which has the above luminance imbalance, a sharp difference in luminance shows so conspicuously as to spoil the quality of the entire picture on the screen. The conventional practices have not provided any solution to this important problem.

SUMMARY OF THE INVENTION

This invention is accomplished to provide a video display apparatus which, when used for displaying two or more kinds of pictures with different aspect ratios, makes unnoticeable the luminance variation at the ends of the picture display portion.

In this invention, to achieve the above objective, the blank portions on the screen where no picture is displayed are illuminated at a brightness level almost equal to the picture mean luminance when the video display apparatus is displayed with a picture having an aspect ratio different from that of the screen.

Also in the invention, the picture display portion is moved over the entire screen when a picture having an aspect ratio different from that of the video screen is displayed on the screen.

Furthermore, the video display signals are attenuated toward the ends of the picture display portion when a picture having an aspect ratio different from that of the video screen is displayed on the screen.

BRIEF DESCRIPTION OF THE DRAWINGS

FIG. 8 is signal waveforms when the picture display portion is moved;

FIG. 9 is an example of a driver circuit that causes the picture display portion to move on the screen;

FIG. 10 is an example of signal waveform which is made to fade out toward the ends of the picture display portion;

FIG. 11 is an example of ordinary video signal waveform;

DESCRIPTION OF THE PREFERRED EMBODIMENTS

When ordinary display apparatuses are used, including cathode-ray tubes, gradual deterioration occurs with materials associated with image display and its, unavoidable consequence is the reduction in display luminance or change in distribution of the three primary colors on the screen at locations where pictures have been displayed for many hours. This invention uses the entire area of the screen of the display apparatus as uniformly as possible, as mentioned earlier, to eliminate the otherwise unavoidable variations in luminance and color that occur at the boundary between different picture display portions with different aspect ratios because of difference in display time.

When the blank portions on the screen where no pictures are displayed are to be illumined, it is preferable, from the basic stance of this invention, to uniformly illuminate the blank portions in grey at the same luminance as the average luminance of the picture part of the screen or the picture mean luminance. The blank portion, however, may be given some colors or displayed with some patterns without heavy contrast. Displaying colors too close to the primary colors in the blank portions will cause a kind of browning phenomenon because different picture display portions have different degree of deteriorations of fluorescent materials. So, if colors other than grey are used, they are preferably those of low chomatic level.

Figure 4:
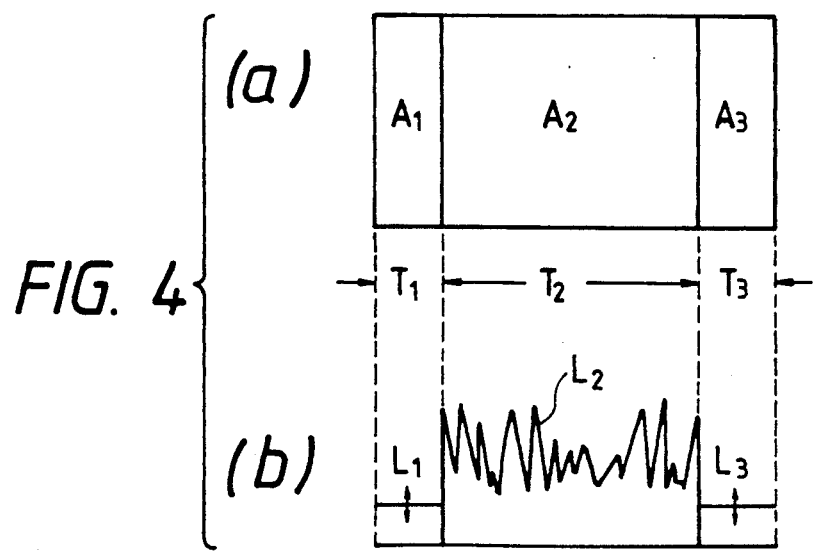
FIG. 4 is an example pattern on the screen in which the blank portion is illuminated at almost the same brightness as the average luminance of the picture display portion.
Figure 5:
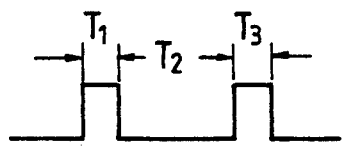
FIGS. 5 and 6 are the configuration of one embodiment of this invention for illuminating the blank portion as described above.
Figure 6:
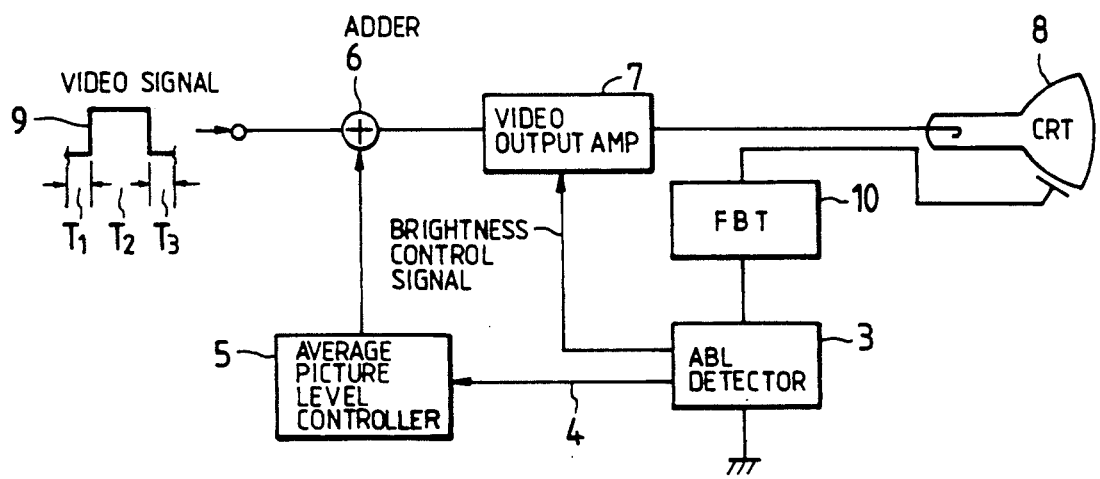

FIGS. 4 to 6 show examples in which the blank portions on the screen are illumined at the same brightness as the picture mean luminance.

In FIG. 4, (a) shows blank portions A1 and A3 on each side of the picture display portion A2; and (b) shows the average luminance level L1 and L3 and the video signal level L2.

FIG. 5 shows a waveform of the drive signal for controlling the luminance level of the grey signal for the period T1 and T3.

FIG. 6 is a block diagram of a circuitry for producing the drive signal.

As shown in FIG. 6, a high-voltage average current is detected by an ABL (automatic brightness limiter) detector 3, whose output 4 is sent to an APL (average picture level controller) 5. The output of the APL 5 is fed to an adder 6 which adds the APL output to the sides of each video signal 9. The video signal 9 with the APL output on each side is supplied to the video output amplifier 7, from which it is further sent to the CRT (cathode-ray tube) 8 of the video display apparatus FBT (flyback transformer) 10 is coupled to the ABL detector 3. Then for the durations T1 and T3, the frame signal levels on the blank areas A1 and A3 are controlled so that they have the luminance level identical with the average luminance level of the picture portion A2 of the screen (duration T2).

That is, in this embodiment the blank portions on the screen can be excited to desired average luminance levels L1 and L3, so that when the picture for HDTV system is received, variations in display luminance on the screen are small generating proper pictures with uniform luminance over the entire screen.

The above average luminance is estimated to be roughly 40% of the luminance of the picture portion. So when this value is used, the average luminance level control means can further be simplified.

As mentioned above, to produce a grey display or other picture display on the blank portions, it is necessary to generate signals for filling in the blank portions. This can be achieved by preparing a line memory or frame memory. For example, the EDTV or HDTV usually incorporates the frame memory, so they can be used for this purpose. The fundamental technique for image filling has already been is use. This technique is quite the same as those used to display a small picture of other channel on a part of the picture display portion of the screen or to produce a channel information display or other displays on the ordinary screen. These techniques can be applied to our purpose.

The pictures that can be displayed on the blank portions according to this invention include, as mentioned above, channel or other information or a small picture of different channel. However, displaying a particular picture for many hours is not desirable from the so-called screen browning phenomenon, as mentioned above. For example, the channel information will not be displayed at all times but displayed only when demanded. In other times, the blank portions should be returned to a grey illumination.

Now, another embodiment of this invention will be described. Although it cannot prevent a reduction in display luminance or color change due to deteriorated performance of associated members, the second embodiment does prevent the reduced luminance or color change from sharply showing on a particular boundary line between the different picture display portions with different aspect ratios, by continually moving the picture display position over the entire screen. The speed of moving the picture display position should be slow to a such degree that it will not affect the view of the displayed picture and that it cannot be recognized by human eyes (for instance, one cycle is of the order of several minutes to several hundred hours.) It is apparent that the larger the amplitude of movement, the greater its effect. That is, it is effective for reducing the luminance variations to move the picture display area over the whole fluorescent surface of the screen. When, however, the movement of the displayed area from the extreme left end to the extreme right end of the fluorescent screen seems too large and causes disadvantages to some observers, it is necessary to find a proper compromise amplitude of movement by comparing the practically permissible amplitude of movement and the corresponding amount of reduction in luminance variation.

Displaying of no-signal grey light on the blank portions will reduce the luminance variation to some exent. And it is therefore desired that the grey light display be used in combination with the movement of the picture display area. It is also possible to produce a channel or other information display or a small picture display on the blank portions.

Figure 1:
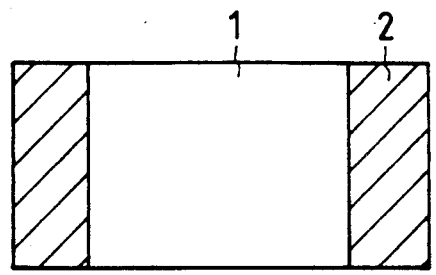
FIGS. 1 to 3 are explanatory drawings showing the picture display portion and the blank portions on a screen of the HDTV that occur when normal TV pictures are displayed on the HDTV screen with an aspect ratio different from those of the ordinary TV.
Figure 2:
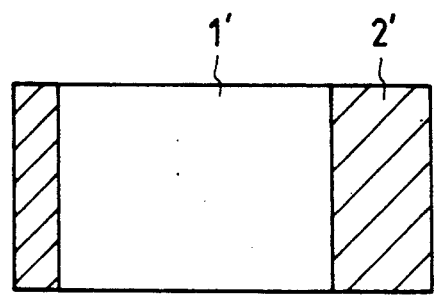
Figure 3:
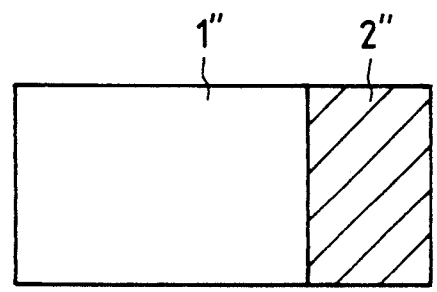
Figure 7:
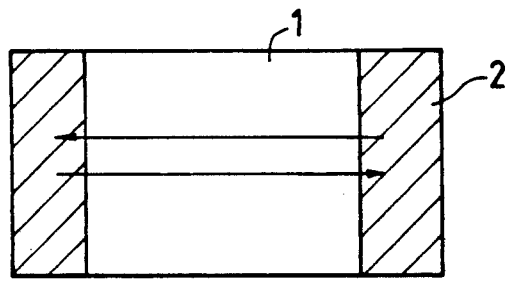
FIG. 7 is an explanatory drawing showing how the picture display portion of the screen is moved.

FIG. 7 shows how the picture area is moved on the fluorescent CRT screen. Examples of positions of the moved display area are shown in FIGS. 2 and 3.

FIGS. 8 and 9 show operation signals when the display area is being moved on the fluorescent screen and an example circuit for moving the display area.

The horizontal synchronizing pulse signals P1, P2 determine the widths of the blank portions A1, A3 (corresponding to the durations T1, T3 of the frame signals) and the width of the picture display portion A2 corresponding to the duration T2 of the video signal). FIG. 9 shows an example of circuit that moves the picture display area from the position indicated by T1 to T3 to the position indicated by T1' to T3, In FIG. 9, a low-frequency current signal $I_{CON}$ for controlling the amount of movement is applied to the horizontal deflection yoke Ly to control the amount of movement of the picture display area. In FIG. 8, (c) represents the picture display area moved from (b) by Sb-c.

The movement of the picture display area is performed in various ways. That is, it may be moved slowly while an observer watches the display on the screen; or the picture display area may be moved only when the display apparatus is switched on or each time the channel is changed. In the latter case, the current $I_{CON}$ need be turned on and off according to the operation of the associated switches.

Other circuit elements in FIG. 9 are similar to those of the deflection circuit in conventional CRT's and description of their operations is omitted.

Moving the raster (picture) on the fluorescent CRT screen may be accomplished by producing signals for blank portions and adjusting the length of the blank portion signals on each side of the raster signal. The generation of the blank portion signal is done by using the line memory or frame memory. For example, EDTV and HDTV usually have the frame memory and this can be utilized for the generation of the blank portion signals.

As an alternative, the deflection circuit may be formed as a multi-scan system (multi-frequency deflection system) to display the received image signal directly on the raster. In this case, the picture can be moved to the right and left by superimposing a current of extremely low frequency (almost direct current) on the horizontal deflecting current.

In a still another embodiment of the invention, the contrast signal and the luminance level near the end of the picture display area on the screen are gradually faded down toward the ends of the display area so as to minimize the change in deterioration of members at the end of the picture display area, i.e., to minimize reduction in luminance or change of color due to the browning phenomenon. This makes practically unnoticeable the browning phenomenon such as reduction in luminance or change of color in areas corresponding to the ends of the previously displayed section of the screen. FIG. 10 shows an example of signal whose level is faded down toward the ends of the picture display portion according to this invention, while FIG. 11 shows an ordinary video signal.

The greater the fade-out region, the less conspicuously the boundary shows but the smaller the effective image area will be. It is thus necessary to set the fade-out region at an appropriate value.

In addition to performing the fade-out, the no-signal grey illumination may be displayed on the blank portions for more effective reduction in luminance variations. It is of course possible to show a channel or other information display or a small picture display on the blank portions.

At the same time that the fading out is done, the entire raster may be moved to the right and left at a slow speed unnoticeable to human eyes. This combines the fade-out effect with the raster movement effect in reducing the luminance variations.

Figure 12:
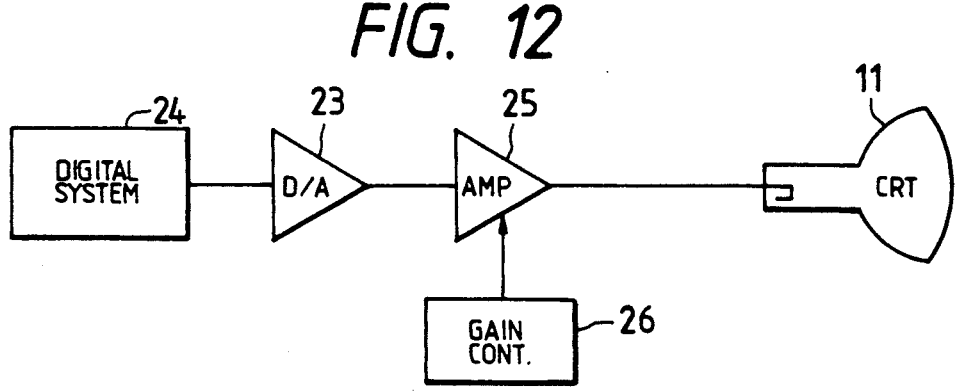
FIG. 12 is an example block diagram of a system for generating the video signal whose level is faded down toward the ends of the picture display portion.
Figure 13:
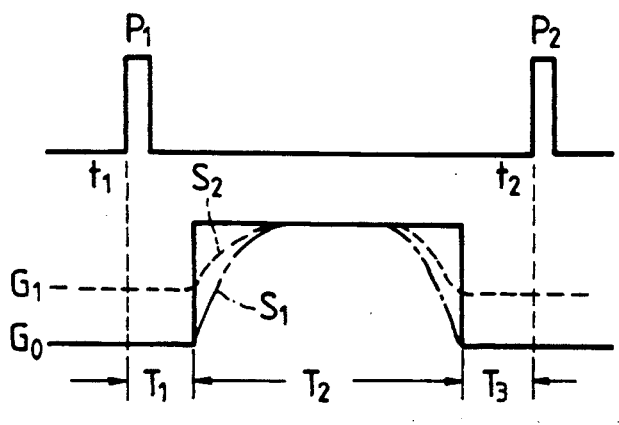
FIG. 13 is a video signal waveform generated by the system of FIG. 12.

FIG. 12 shows one example circuitry for damping the video signal at each end. Damping of the video signal is accomplished by controlling the gain of an amplifier 25 provided before the CAT 11 by a gain controller 26. The above control sets the gain of the amplifier 26 as shown by the characteristics S1 and S2, according to the basic pulses P1, P2 and to the values T1, T2, T3 that determine the blank portions and the picture display portion.

Figure 14:
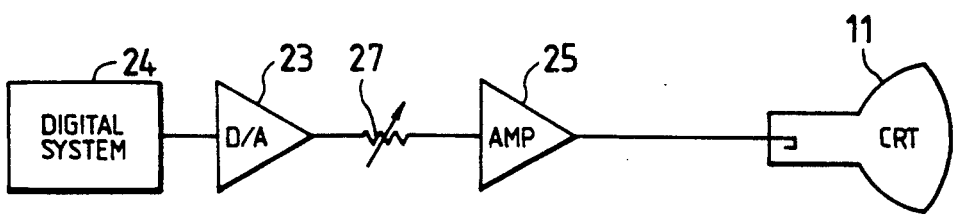
FIG. 14 is another embodiment for generating the video signal whose level is faded down toward the ends of the picture display portion.

FIG. 14 shows a circuitry which uses a variable resistor attenuator 27 provided before the amplifier 25 to change the gain of the amplifier in such a way as to cause a large attenuation at the ends of the raster signal (picture signal) and no attenuation at the center of the picture display area. This enables the video signal to be formed into a desired shape.

For the signal with the above attenuation characteristic to be used directly as an image display signal, it is necessary that the deflection circuit be of the multi-scan system (multi-frequency deflection system).

When the above special attenuator output is stored temporarily in memory, only the video signal (say, for HDTV) need be rearranged for display without increasing the number of deflection system, of which only one is provided. The memory in this case may be the frame memory usually incorporated in the EDTV and HDTV.

Although in the above embodiments, descriptions have been made of the cases where a picture with a 4:3 aspect ratio is displayed on a TV screen with a 16:9 aspect ratio, the aspect ratios may be otherwise. The application of the invention is not limited to the television system but it may be applied to general displays for industrial use or simple monitor use.

What is claimed is:

1. A video display apparatus for displaying pictures with different aspect ratios, comprising:
   means for receiving a first video signal and a second video signal, the first and second video signals having different aspect ratios;
   a picture display section for displaying a picture produced by one of the first and second video signals on a screen having fluorescent materials thereon; and
   means for illuminating blank portions on the screen where no picture is displayed at a brightness level substantially equal to a picture mean luminance of a picture display portion when the second video signal is displayed on the display section, the blank portions being produced because of the difference in aspect ratio between the first and second video signals;
   wherein the illuminating means includes means for continuously detecting a high-voltage mean current for driving the screen, and means responsive to the detecting means for obtaining a respective mean value of the continuously detected high-voltage mean current and for illuminating the blank portions at the brightness level substantially equal to the picture mean luminance in accordance with the mean value when the second video signal is displayed on the display section, the first video signal being a high-quality TV signal and the second video signal being a standard TV signal.

2. A video display apparatus according to claim 1, wherein the illuminating means includes means for displaying information in the blank portions.

* * * * *